United States Patent
Cetintas et al.

(10) Patent No.: US 10,672,025 B2
(45) Date of Patent: Jun. 2, 2020

(54) SYSTEM AND METHOD FOR TRAFFIC QUALITY BASED PRICING VIA DEEP NEURAL LANGUAGE MODELS

(71) Applicant: Oath Inc., New York, NY (US)

(72) Inventors: Suleyman Cetintas, Santa Clara, CA (US); Pengyuan Wang, Sunnyvale, CA (US); Jian Yang, Palo Alto, CA (US); Puneet Mohan Sangal, Sunnyvale, CA (US)

(73) Assignee: Oath Inc., New York, NY (US)

( * ) Notice: Subject to any disclaimer, the term of this patent is extended or adjusted under 35 U.S.C. 154(b) by 721 days.

(21) Appl. No.: 15/064,310

(22) Filed: Mar. 8, 2016

(65) Prior Publication Data
US 2017/0262878 A1    Sep. 14, 2017

(51) Int. Cl.
*G06Q 30/02* (2012.01)

(52) U.S. Cl.
CPC ..... *G06Q 30/0244* (2013.01); *G06Q 30/0246* (2013.01); *G06Q 30/0256* (2013.01); *G06Q 30/0273* (2013.01)

(58) Field of Classification Search
CPC combination set(s) only.
See application file for complete search history.

(56) References Cited

U.S. PATENT DOCUMENTS

| | | | |
|---|---|---|---|
| 8,417,807 B2 | 4/2013 | Malhorta et al. | |
| 2012/0215645 A1 | 8/2012 | Chung et al. | |
| 2014/0129323 A1* | 5/2014 | Amirbekian | G06Q 30/0242 705/14.45 |
| 2014/0188593 A1* | 7/2014 | Sun | G06Q 30/0256 705/14.41 |

OTHER PUBLICATIONS

"Automatic Classification of Web Queries Using Very Large Unlabeled Query Logs", by Beitzel et al. Illinois Institute of Technology. ACM Transactions on Information Systems, vol. 25, No. 2, Article 9. Publication Date: Apr. 2007. (Year: 2007).*

"The Ultimate Guide to Quality Score: 15 PPC Experts Discuss the Nuts and Bolts of Google AdWords Quality Score and How to Improve Yours", by Goodman et al. WordStream Inc. Jun. 19, 2010. (Year: 2010).*

* cited by examiner

*Primary Examiner* — William A Brandenburg
(74) *Attorney, Agent, or Firm* — Cooper Legal Group, LLC

(57) ABSTRACT

Systems, devices, and methods are disclosed for determining the quality of traffic received from different web page publishers, and setting a pricing structure for the different traffic based on the determined quality of traffic. Accurately determining the quality of traffic and/or clicks from different publishers allows the network system described herein to offer a fair marketplace with just return on investments (ROI) for advertisers, and offer a robust and accurate traffic quality based pricing model for publishers. Internet based technology, and in particular deep learning techniques available through a neural network, are utilized to determine the pricing structure based on click and/or web page traffic quality measurements generated through the deep learning techniques.

20 Claims, 4 Drawing Sheets

SYSTEM AND METHOD FOR TRAFFIC QUALITY BASED PRICING VIA DEEP NEURAL LANGUAGE MODELS

BACKGROUND

Within a network system, a web server may host a web page that includes both web page content as well as a search engine for searching the web page content. A user's communication device running a web browser application may access the web server directly to render the web page within the web browser application. The user may also access the web page after being re-directed to the web page through a link included on another web page. Navigating different web pages on the network system allows historical web browsing information to be gathered on the user.

In addition to the web page content and search engine, some web pages are designed to include dedicated display areas for displaying advertisements. Internet advertising has created a new environment in which technology is utilized to provide advertisers with the ability to develop new advertisement presentation platforms for offering deals to consumers. Internet advertising also provides advertisers with the tools and information for creating more cost effective advertisement campaigns that are better targeted to relevant consumers that is not available outside of the internet.

DETAILED DESCRIPTION

Figure 1:
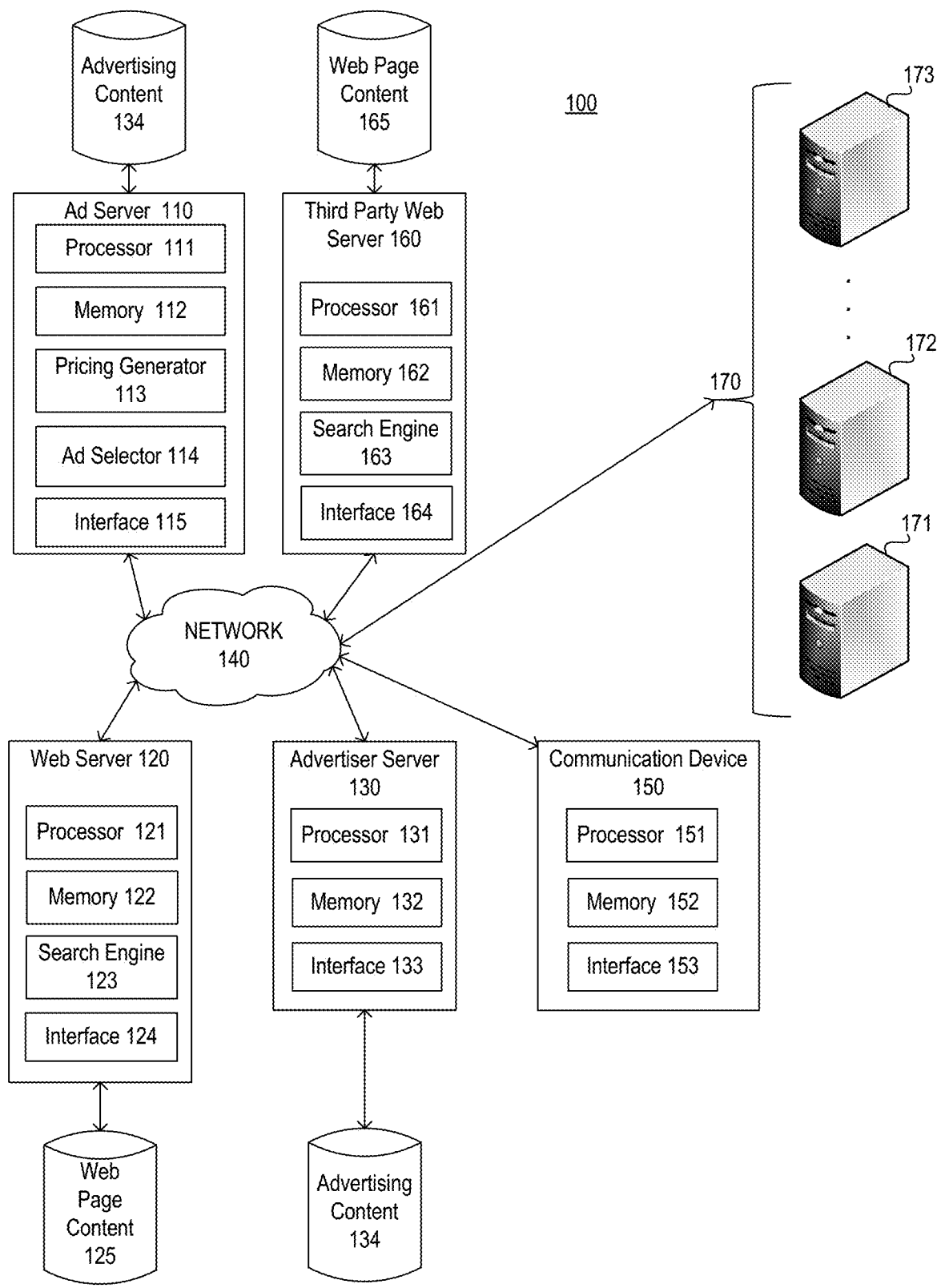
FIG. 1 illustrates a system diagram of an exemplary advertisement network system.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

With the increasing popularity of consumers viewing web-based content for entertainment, research, obtaining news, shopping, or other types of tasks involving the exchange of information, advertisers and web page publishers have taken notice. Accordingly, new internet-based advertisement network systems are created that take advantage of internet technology not previously available.

Within the advertisement network system, an advertiser is understood to generate and otherwise provide an internet advertisement that offers, for example, goods or services for sale. The internet advertisement may then be displayed on a web page. The advertiser may control an advertiser server that creates the internet advertisement.

A publisher is understood to host a web page for receiving an advertiser's internet advertisement, and displaying the internet advertisement. The publisher may control a publisher web server that hosts a web page for displaying web content and the internet advertisement. The publisher may also control an ad server that selects the internet advertisement for display on the web page based on a user's search query input to a search engine on the host web page. An advertiser may agree to pay a cost-per-click (CPC) rate to a web page publisher for each click on an internet advertisement published on the publisher's web page. Clicking on the internet advertisement may navigate a user to the advertiser's web page.

The ad server may also be responsible for determining the pricing for a particular CPC rate to charge an advertiser based on a set of internet-centric information. For example, the ad server may determine the CPC rate based on attributes of the publisher, attributes of the user's communication device from which the user accesses the hosted web page, and/or attributes of the search inquiry that resulted in the internet advertisement being selected for display on the hosted web page. According to some embodiments, the ad server may be part of the web server, and according to other embodiments the ad server may be a separate device in communication with the web server.

Publishers may further be distinguished between owned and operated publishers (OO publishers) and third party publishers. An OO publisher may control web servers that host major web page content providers (e.g., Yahoo) and associated web servers. The web pages associated to OO publishers may be specifically identified by advertisers for displaying their internet advertisements. On the other hand, third party publishers may not be directly associated with an OO publisher or advertiser. Rather, the third party publisher may include a search engine associated with the OO publisher (e.g., Yahoo search), and have an agreement with the OO publisher to display internet advertisements from a same database of internet advertisements available to the OO publisher, but may otherwise not be affiliated or controlled by the OO publisher. Even so, the third party publisher web page may select the same internet advertisements as the OO publisher web page based on the search query input into the same search engine. The OO publisher may then split CPC revenue with the third party publisher for clicks on internet advertisement displayed on the third party publisher's web page. For example, if the OO publisher agrees to a $0.10 per click CPC rate with the advertiser, the OO publisher may then negotiate an 80/20 split (e.g., $0.08 going to the OO publisher and $0.02 going to the third party publisher) with the third party publisher for any clicks on the advertiser's internet advertisement originating from the third party publisher's web page.

By clicking on the advertiser's internet advertisement, the user may be directed to the advertiser's own web page that promotes the advertiser's goods or services. Once the user is navigated to the advertiser's web page, a conversion on an advertiser offer may be accomplished by the user. A conversion may be understood to be one or more of, the user clicking on the internet advertisement, the user browsing the advertiser's web page for a predetermined length of time, the user inputting personal information (e.g., name, mailing address, phone number, or email address) through an information input field on the advertiser's web page, or the user actually buying a good or service offered by the advertiser on the advertiser's web page.

A large search engine, such as Yahoo Search, receives traffic from various publishers such as the OO publisher and the third party publisher. Sponsored internet advertisements provided by advertisers may be displayed on a web page running the search engine, as described throughout this disclosure, where sponsored searches may follow CPC based pricing. However, clicks from different publishers are valued different because different publishers may perform at different quality levels (e.g., a publisher's quality level may be based on the publisher's conversion rates). For example, a click from a third party publisher web page may not be worth as much as a click from an OO publisher web page. This may be because the conversion rate for a click originating from a third party publisher web page may not be as high as a click originating from an OO publisher web page.

Therefore, systems, devices, and methods are disclosed for determining the quality of traffic and/or clicks received from different publishers. Pricing estimates may then be generated according to different CPC rates assigned to traffic from different publishers based on the publisher's determined quality. Accurately determining the quality of traffic and/or clicks from different publishers allows the network system described herein to offer a fair marketplace with just return on investments (ROI) for advertisers, and offer a robust and accurate traffic quality based pricing model for publishers. Under or over pricing of the CPC rates can lead to significant revenue loss for publishers as well as over spend for advertisers, both of which cases lead to publisher attrition and direct revenue loss.

The systems, devices, and methods utilize internet based technology, and in particular deep learning techniques available through a neural network, to generate CPC rates as part of a pricing estimate strategy based on click and/or web page traffic quality measurements generated through the deep learning techniques.

According to a first aspect, a server system is disclosed. The server system includes a network interface configured to receive hyperlink selection information, the hyperlink selection information including dimensional information. The server system may further include a processor configured to communicate with the network interface, control the network interface to access a neural network, parse the neural network to identify a query cluster relating to the hyperlink selection information, identify the query cluster relating to the hyperlink selection information based on the dimensional information, the query cluster including traffic quality information for historical search queries included in the query cluster, compare the traffic quality information to a benchmark traffic quality information, and determine a pricing rate corresponding to the hyperlink selection information based on the comparison.

According to a second aspect, a method for generating a pricing rate is disclosed. The method may include receiving, through a network interface, hyperlink selection information, the hyperlink selection information including dimensional information, controlling the network interface to access a neural network, parsing the neural network to identify a query cluster relating to a hyperlink selection information, identifying the query cluster relating to the hyperlink selection information based on the dimensional information, the query cluster including traffic quality information for historical search queries included in the query cluster, comparing the traffic quality information to a benchmark traffic quality information, and determining a pricing rate corresponding to the hyperlink selection information based on the comparison.

According to a third aspect, a network system is disclosed. The network system may include a database configured to store a plurality of internet advertisements, and an advertiser server. The advertiser server may be configured to receive a user search query input to a search engine running on a web page, wherein the user search query input is received from a communication device, communicate with the database, select an advertisement from the plurality of internet advertisements based, at least, on the user search query input, wherein the selected advertisement includes a hyperlink to an external web page, determine whether the hyperlink is selected, when the hyperlink is determined to be selected, access a neural network including a plurality of historical query clusters, parse the neural network to identify a query cluster relating to the hyperlink, identify the query cluster relating to the hyperlink based on the user search query input, the query cluster including traffic quality information for historical search queries included in the query cluster, compare the traffic quality information to a benchmark traffic quality information, and determine a pricing rate corresponding to the hyperlink based on the comparison.

FIG. 1 illustrates an exemplary system diagram of a network system 100 for pricing CPC rates for clicks on an advertiser's internet advertisements based on, at least, gathered internet-centric information and deep learning techniques. The network system 100 includes an advertiser server 130 comprised of a processor 131, a memory 132, and a network interface 133 for accessing network 140. The advertiser server 130 may generate an advertiser's internet advertisement, where the internet advertisement includes a link (e.g., a hyperlink) to the advertiser's web page that is activated when a user clicks on the internet advertisement. The internet advertisements may be stored on an advertising content database 134 that is in communication with the advertiser server 130. The advertiser server 130 may further control the network interface 133 to transmit internet advertisements to other devices within the network system 100 via the network 140.

The network system 100 also includes a web server 120 that hosts one or more web pages corresponding to an OO publisher. The web server 120 may be comprised of a processor 121, a memory 122, a search engine 123, and a network interface 124 for accessing network 140. Web page content included on a web page hosted by the web server 120 may be stored on a web page content database 125 in communication with the web server 120. The search engine 123 may receive a user's search query and search for related web page content in web page content database 125. The web server 120 may select, from the web page content database 125, web page content for display on a hosted web page based on the search results determined by the search engine 123. The web server 120 may also receive internet advertisements from ad server 110 to include in a rendering of a hosted web page.

The network system 100 also includes a third party web server 160 that hosts one or more web pages corresponding to a third party publisher. The third party web server 160 may be comprised of a processor 161, a memory 162, a search engine 163, and a network interface 164 for accessing network 140. Web page content included on a web page hosted by third party web server 160 may be stored on a web page content database 165 in communication with the third party web server 160. The search engine 163 may receive a user's search query and search for related web page content in web page content database 165. The third party web server 160 may select, from the web page content database 165, web page content for display on a hosted web page based on the search results determined by the search engine 163. The third party web server 160 may also receive internet advertisements from ad server 110 to include in a rendering of a hosted web page. According to an embodiment, search engine 163 may be linked to search engine 123 such that the same logic is utilized to return search results to search queries input into both search engine 163 and search engine 123.

The network system 100 also includes a communication device 150 that may be comprised of a processor 151, a memory 152, and a network interface 153 for accessing network 140. The communication device 150 may be for example, a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. Further, the communication device 150 may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. The communication device 150 may also include or execute an application to communicate content, such as, for example, textual content, multimedia content, or the like. The communication device 150 may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

Figure 3:
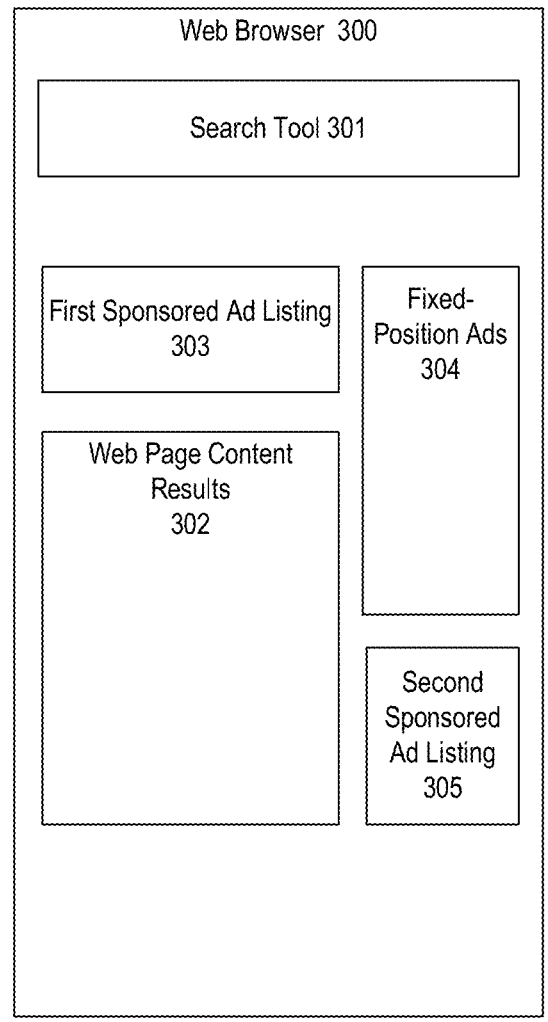
FIG. 3 illustrates an exemplary web browser rendering.

For example, communication device 150 may run a web browser application for accessing a web page hosted by web server 120 or third party web server 160, and rendering web page content corresponding to the hosted web page within the web browser application. FIG. 3 illustrates an exemplary web browser 300 running on, for example communication device 150, and rendering a web page hosted by, for example, web server 120 or third party web server 160. The web page rendered by web browser 300 includes a search tool 301, where the search tool 301 may correspond to search engine 123 or search engine 163 included in web server 120 or third party web server 160, respectively. The web page further includes a first sponsored ad listing 303, fixed position ads 304, and a second sponsored ad listing 305. Each of the first sponsored ad listing 303, the fixed position ads 304, and the second sponsored ad listing 305 may have been selected by, for example, the ad selector 114 of ad server 110 based on search input and/or search results analyzed by search engine 123 or search engine 163 included in web server 120 or third party web server 160, respectively. The web page rendered by web browser 300 may further include web page content results 302, generated by, for example, search engine 123 or search engine 163, respectively, based on a search query input by the user into the search tool 301. Further description for rendering and operating a web page within the network system 100 is provided throughout this disclosure.

The network system 100 also includes the ad server 110, which may in turn include: a processor 111, a memory 112, a pricing generator 113, an ad selector 114, and a network interface 115 for accessing network 140. The ad server 110 may communicate with web server 120 to select an internet advertisement from, for example, advertising content database 134, to display on a web page hosted by web server 120 based on information received from web server 120. In particular, ad server 110 may select internet advertisements to display on a web page hosted by web server 120 based on a user's search query input to search engine 123, communication device 150 attribute information, publisher identification information, and/or search query result information generated by search engine 123. Ad server 110 ad server 110 may also select internet advertisements to display on a web page hosted by third party web server 160 based on a user's search query input to search engine 163, communication device 150 attribute information, publisher identification information, and/or search query result information generated by search engine 163.

The pricing generator 113 may determine a CPC rate based on dimensional information received from web server 120, third party web server 160, and/or communication device 150. The dimensional information may include, for example, search query information (e.g. a user's search query input to search engine 123 or search engine 163), communication device information (e.g., information identifying a device type of communication device 150), and/or publisher identification information (e.g., information identifying web server 120 or third party web server 160 as being associated with an OO publisher or a third party publisher). The dimensional information may reference historical information that identifies the historical quality (e.g., conversion rate) for previous traffic received based on a similar or same search query, a similar or same communication device, a similar or same publisher web page, or some combination thereof. For example, when the pricing generator 113 is preparing to generate a CPC pricing estimate for a current click traffic resulting from search query A, received from publisher web page B, and where publisher web page B was accessed from communication device type C, pricing generator 113 may reference historical dimensional information for conversion rates of clicks received from the same or similar search query A, conversion rates of clicks received from publisher web page B or another similar/related publisher web page, conversion rates of clicks where the publisher web page was accessed from a same, or similar, type of communication device as communication device C, or some combination of the three dimensional information pieces that are available. The historical dimensional information may be referenced from query clusters generated by neural network 170, as described in more detail herein.

According to some embodiments, ad server 110 may be included as part of the web server 120, while in other embodiments ad server 110 may be a separate computing device as illustrated in FIG. 1. The ad server 110 may also be in communication with advertising content database 134 that stores internet advertisements. The internet advertisements stored on advertising content database 134 may have been received from advertiser server 130 through network interface 115 via the network 140.

The web page content and internet advertisements content described with reference to web server 120, third party web server 160, and ad server 110 may be integrated together before being delivered to the web browser application running on the communication device 150.

The network system 100 also includes a neural network 170 comprised of a plurality of server computers. For example, neural network 170 may be comprised of first server computer 171, second server computer 172, and third server computer 173. The neural network 170 may be configured to apply deep learning techniques (e.g., query2vec and/or word2vec) to help group together known queries received by a networked search engine (e.g., search engine 123 and/or search engine 163) into query clusters. The neural network 170 may then utilize traffic quality attributes (e.g., conversation rates) for internet attributes (e.g., dimensional information) selected for queries within a common query cluster to calculate a pricing estimate for a present query. Utilizing the deep learning techniques to group known queries into query clusters and reference the historical traffic quality attributes (e.g., conversion rate) of a query cluster as opposed to the historical traffic quality attributes of an individual query, results in a more robust and accurate pricing estimate. Previous solutions of referencing individual queries had the problem of data sparsity, in that accurate pricing estimates could not be ensured across a wide range of possible search queries due to high fragmentation of traffic due to the very high dimensionality in the search queries.

The solution of utilizing deep learning to group queries into query clusters helps generate pricing suggestions for substantially more search query keywords, and helps price substantially higher portions of traffic more accurately. The advantages of grouping queries into query clusters become evidence even when there are a small number of high-trafficked queries.

Network 140 may include a wireless network configured to couple communication device 150 with other client devices coupled to the wireless network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, the network 140 may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within the network 140, or the like.

Signal packets communicated via the network 140, which may include a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of the network 140, such as, for example, to one or more sites employing a local network address. A signal packet may, for example, be communicated over the Internet from a user site via an access node coupled to the Internet. Likewise, a signal packet may be forwarded via network nodes to a target site coupled to the network 140 via a network access node, for example. A signal packet communicated via the Internet may, for example, be routed via a path of gateways, servers, etc. that may route the signal packet in accordance with a target address and availability of a network path to the target address.

The network 140 may also include a "content delivery network" or "content distribution network" (CDN), where the CDN generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

The network 140 may also include a peer-to-peer (or P2P) network, where the P2P network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

With respect to the network 140, the network 140 may couple devices so that communications may be exchanged, such as between web server 120, third party web server 160, and communication device 150, or other devices within network system 100, including between wireless devices coupled via a wireless network, for example. The network 140 may also include mass storage, such as network attached storage (NAS), a storage area network (SAN), or other forms of computer or machine readable media, for example. The network 140 may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within the larger the network 140. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to the network 140, such as via a telephone line or link, for example.

Figure 2:
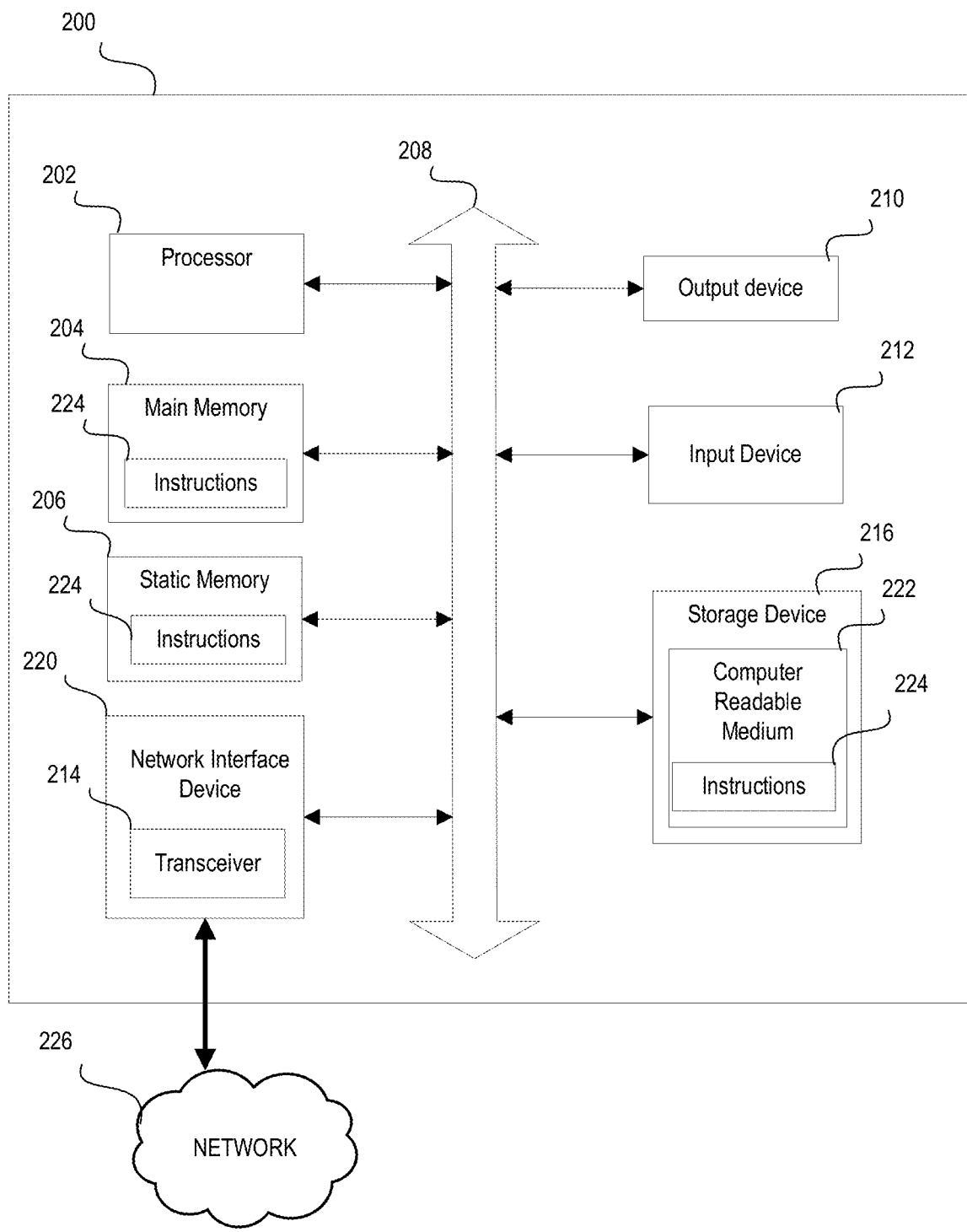
FIG. 2 illustrates a block diagram of exemplary computer architecture for one or more components included in the exemplary network illustrated in FIG. 1.

FIG. 2 illustrates exemplary computer architecture for a computer 200. Embodiments of the computer 200, including embodiments that include additional components and embodiments including fewer components than described, may be representative of any one or more of the devices that comprise network system 100 illustrated in FIG. 1.

The computer 200 includes a network interface device 220 that enables communication with other computers via a network 226, where network 226 may be represented by the network 140 in FIG. 1. The computer 200 may include a processor 202, a main memory 204, a static memory 206, the network interface device 220, an output device 210 (e.g., a display or speaker), an input device 212, and a storage device 216, all connected via a bus 208.

The processor 202 represents a central processing unit of any type of architecture, such as a CISC (Complex Instruction Set Computing), RISC (Reduced Instruction Set Computing), VLIW (Very Long Instruction Word), or a hybrid architecture, although other appropriate processors may be used. The processor 202 executes instructions and includes portions of the computer 200 that control the operation of the entire computer 200. The processor 202 may also represent a controller that organizes data and program storage in memory and transfers data and other information between the various parts of the computer 200.

The processor 202 is configured to receive input data and/or user commands from the input device 212. The input device 212 may be a keyboard, mouse or other pointing device, trackball, scroll, button, touchpad, touch screen, keypad, microphone, speech recognition device, video recognition device, or any other appropriate mechanism for the user to input data to the computer 200 and control operation of the computer 200 and/or operation of the process steps and other features described herein. Although only one input device 212 is shown, in another embodiment any number and type of input devices may be included. For example, input device 212 may include an accelerometer, a gyroscope, and a global positioning system (GPS) transceiver.

The processor 202 may also communicate with other computers via the network 226 to receive instructions 224, where the processor may control the storage of such instructions 224 into any one or more of the main memory 204, such as random access memory (RAM), static memory 206, such as read only memory (ROM), and the storage device 216. The processor 202 may then read and execute the instructions 224 from any one or more of the main memory 204, static memory 206, or storage device 216. The instructions 224 may also be stored onto any one or more of the main memory 204, static memory 206, or storage device 216 through other sources. The instructions 224 may correspond to, for example, instructions that represent the pricing generator 113 described herein.

Although computer 200 is shown to contain only a single processor 202 and a single bus 208, the disclosed embodiment applies equally to computers that may have multiple processors and to computers that may have multiple busses with some or all performing different functions in different ways.

The storage device 216 represents one or more mechanisms for storing data. For example, the storage device 216 may include a computer readable medium 222 such as read-only memory (ROM), RAM, non-volatile storage media, optical storage media, flash memory devices, and/or other machine-readable media. In other embodiments, any appropriate type of storage device may be used. Although only one storage device 216 is shown, multiple storage devices and multiple types of storage devices may be present. Further, although the computer 200 is drawn to contain the storage device 216, it may be distributed across other computers, for example on a server.

The storage device 216 may include a controller (not shown) and a computer readable medium 222 having instructions 224 capable of being executed by the processor 202 to carry out processes described herein. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. The storage device 216 may also contain additional software and data (not shown), which is not necessary to understand the features described herein.

Output device 210 is configured to present information to the user. For example, the output device 210 may be a display such as a liquid crystal display (LCD), a gas or plasma-based flat-panel display, or a traditional cathode-ray tube (CRT) display or other well-known type of display in the art of computer hardware. Accordingly, in some embodiments the output device 210 displays a user interface. In other embodiments, the output device 210 may be a speaker configured to output audible information to the user. In still other embodiments, any combination of output devices may be represented by the output device 210.

Network interface device 220 provides the computer 200 with connectivity to the network 226 through any suitable communications protocol. The network interface device 220 sends and/or receives data from the network 226 via a wireless or wired transceiver 214. The transceiver 214 may be a cellular frequency, radio frequency (RF), infrared (IR) or any of a number of known wireless or wired transmission systems capable of communicating with the network 226 or other computer device having some or all of the features of computer 200. Bus 208 may represent one or more busses, e.g., USB, PCI, ISA (Industry Standard Architecture), X-Bus, EISA (Extended Industry Standard Architecture), or any other appropriate bus and/or bridge (also called a bus controller).

The computer 200 may be implemented using any suitable hardware and/or software, such as a personal computer or other electronic computing device. In addition to the various types of wearable devices described herein, the computer 200 may also be a portable computer, laptop, tablet or notebook computer, PDA, pocket computer, appliance, telephone, or mainframe computer.

Figure 4:
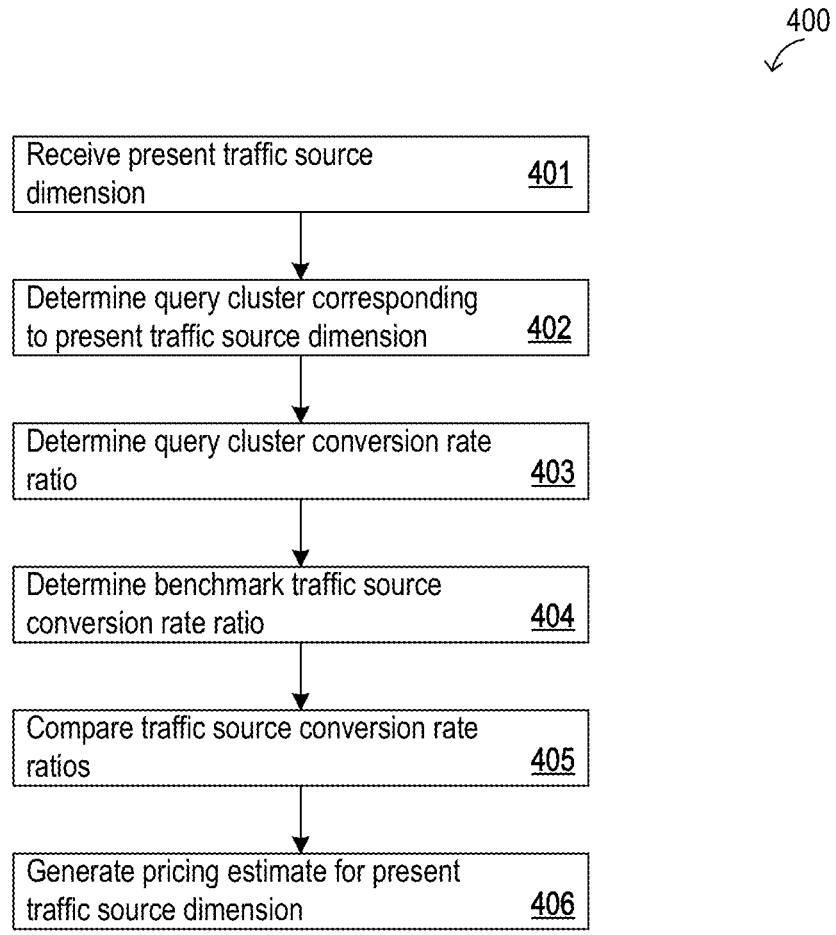
FIG. 4 illustrates a flow diagram of logic describing a process for generating a price estimate, according to some embodiments.

FIG. 4 is a flow diagram 400 of logic that a pricing generator (e.g., pricing generator 113) may implement to generate a dynamic CPC pricing estimate for traffic received from a web page hosted on a third party publisher's web server (e.g., third party web server 160) that includes certain known present traffic source dimensions. The present traffic source dimensions may identify a third party publisher web page where a user clicked on an advertiser's internet advertisement, a user's search query that resulted in the internet advertisement being clicked, a communication device type that accessed the third party publisher web page, or some combination thereof. Reference to network system 100, as well as components of network system, may be used during the discussion of flow diagram 400 for exemplary purposes.

The pricing generator 113 may receive the present traffic source dimensions (401). For example, the present traffic source dimensions may include three dimensions: (device, publisher identification, search query information), two dimensions: (device, search query information), or two dimensions: (device, publisher identification). The present traffic source dimension may be received from, for example, third party web server 160 hosting the third party web page.

The pricing generator 113 may determine a query cluster that corresponds to the present traffic source dimension (402). For example, pricing generator 113 may access neural network 170, where neural network 170 has grouped previous traffic based on a similarity of traffic source dimensions such as the user's search query. Deep learning techniques may have been employed by the neural network 170 to help group previous traffic based on a similarity of traffic source dimensions, such as grouping traffic having similar user search query information as well as other dimensions. A deep neural language model powered by the neural network 170 may be utilized to learn high-quality vector representations of user search queries, and these representations can be used by standard clustering techniques (e.g., k-means, hierarchical clustering, etc.) to group similar user search queries into a predetermined number of query clusters. For example, after identifying the proper query cluster, the pricing generator 113 may reference (device, publisher identification, query group), (device, query group), or (device, publisher identification) dimensions for generating the pricing estimate. Present traffic source dimensions that include the query group information may result in a more accurate query cluster determination at (402).

The grouping strategy implemented by neural network 170 may consider creating a predetermined number of query clusters that optimizes the robustness of the search queries within each query cluster. To satisfy the creation of the predetermined number of query clusters, the neural network 170 may set a user search query similarity sensitivity level to group traffic source dimensions into the predetermined number of query clusters (e.g., 1000 query clusters).

The pricing generator 113 may determine a query cluster conversion rate ratio based on the determined query cluster (403). As an example, the query cluster may identify third party publisher A, having 100 conversions for 1000 clicks, on a smartphone type of communication device, when the user search query includes key words "dress" and "shoes". Then the third party publisher conversion rate ratio for the query cluster, CVR ratio_QC (smartphone, publisher A, query cluster including key words "dress" and "shoes"), is 100/1000=0.10.

The pricing generator 113 may determine a benchmark traffic source conversion rate ratio at the query cluster level (404). The benchmark traffic source conversion rate ratio, CVR ratio_BM, may be the conversion rate ratio for an OO publisher such as Yahoo. As an example, the benchmark traffic source conversion rate ratio within a query cluster that identifies the publisher as Yahoo, the communication device accessing Yahoo as a smartphone, and the user search query including keywords "dress" and "shoes," may be 200 conversion per 1000 clicks. Then the benchmark traffic source conversion rate ratio, CVR ratio_BM (smartphone, publisher Yahoo, query cluster including key words "dress" and "shoes"), is 200/1000=0.20. As calculated, the conversion rate ratio for an OO publisher is higher than the conversion rate ratio for a third party publisher.

The pricing generator 113 may compare the third party publisher conversion rate ratio for the query cluster with the benchmark traffic source conversion rate ratio (405).

The pricing generator 113 may then generate a CPC pricing estimate for the present traffic source dimension based on the comparison (406). For example, the adjusted CPC pricing estimate for the present traffic source dimension received from the third party publisher may be: (CVR ratio_QC/CVR ratio_BM)*(CPC for the benchmark publisher).

By implementing the deep learning query clustering strategy, substantially more CPC pricing estimates may be generated at the (device, publisher identification, search query information) and (device, search query information) dimensional pricing table level. Hence, much more traffic can be priced by these two more accurate pricing tables (the rest of the traffic will still be priced by the (device, publisher identification) table). Ultimately, this leads to a more efficient marketplace, reduces publisher and advertiser attrition, and increases revenue.

The disclosed method and system may be implemented partly in a server, a client device, a cloud computing environment, partially in a server and partially in a client device, or a combination of the server, the cloud computing environment and the client device.

It is therefore intended that the foregoing detailed description be regarded as illustrative rather than limiting, and that it be understood that it is the following claims, including all equivalents, that are intended to define the spirit and scope of this disclosure.

What is claimed is:

1. A server system, comprising:
   a network interface configured to receive hyperlink selection information, the hyperlink selection information including dimensional information; and
   a processor configured to:
   communicate with the network interface;
   control the network interface to access a neural network storing a plurality of historical query clusters each comprising queries grouped together using one or more deep learning techniques;
   parse the neural network to identify at least one query cluster relating to the hyperlink selection information;

identify a query cluster relating to the hyperlink selection information based on a determination that a first publisher web page identified in the dimensional information of the hyperlink selection information is related to a second publisher web page identified in the query cluster, the query cluster including traffic quality information for historical search queries included in the query cluster in association with the second publisher web page;
compare the traffic quality information to a benchmark traffic quality information; and
determine a pricing rate corresponding to the hyperlink selection information based on the comparison.

2. The server system of claim 1, wherein the identifying the query cluster is further based upon at least one of device information, in the dimensional information, identifying a device type where a hyperlink was selected or search query information, in the dimensional information, corresponding to a search query that resulted in an advertisement displaying the hyperlink.

3. The server system of claim 2, wherein the hyperlink includes instructions for controlling navigation to a second web server.

4. The server system of claim 1, wherein the traffic quality information corresponds to a conversion rate ratio for a third party publisher displaying an advertisement including a hyperlink identified in the hyperlink selection information, and the benchmark traffic quality information corresponds to an owned and operated publisher conversion rate ratio.

5. The server system of claim 4, wherein a conversion corresponds to at least one of a user browsing a web page routed to by the hyperlink for a predetermined length of time, the user inputting information to the web page, or a purchase being recorded on the web page.

6. The server system of claim 1, wherein the neural network generates a predetermined number of different query clusters.

7. The server system of claim 6, wherein each different query cluster is generated by the neural network to include previous traffic sharing similar dimensional information based on a predetermined similarity sensitivity.

8. The server system of claim 1, wherein the neural network includes a plurality of query clusters, and each query cluster includes historical traffic quality information for one or more search queries.

9. The server system of claim 8, wherein each of the one or more search queries includes at least one of dimensional information identifying a device type where a hyperlink was selected or search query information corresponding to a search query that resulted in an advertisement displaying the hyperlink.

10. A method for generating a pricing rate, comprising:
receiving, through a network interface, hyperlink selection information, the hyperlink selection information including dimensional information;
controlling the network interface to access a neural network storing a plurality of historical query clusters each comprising queries grouped together using one or more deep learning techniques;
parsing the neural network to identify at least one query cluster relating to a hyperlink selection information;
identifying a query cluster relating to the hyperlink selection information based on the dimensional information, the query cluster including traffic quality information for historical search queries included in the query cluster;
comparing the traffic quality information to a benchmark traffic quality information; and
determining a pricing rate corresponding to the hyperlink selection information based on the comparison.

11. The method of claim 10, wherein the dimensional information includes at least one of device information identifying a device type where a hyperlink was selected, search query information corresponding to a search query that resulted in an advertisement displaying the hyperlink or publisher information corresponding to a third party publisher of the advertisement displaying the hyperlink.

12. The method of claim 11, wherein the hyperlink includes instructions for controlling navigation to a second web server.

13. The method of claim 10, wherein the traffic quality information corresponds to a conversion rate ratio for a third party publisher displaying an advertisement including a hyperlink identified in the hyperlink selection information, and the benchmark traffic quality information corresponds to an owned and operated publisher conversion rate ratio.

14. The method of claim 12, wherein a conversion corresponds to at least one of a user browsing a web page routed to by the hyperlink for a predetermined length of time, the user inputting information to the web page, or a purchase being recorded on the web page.

15. The method of claim 10, wherein the neural network generates a predetermined number of different query clusters.

16. The method of claim 15, wherein each different query cluster is generated by the neural network to include previous traffic sharing similar dimensional information based on a predetermined similarity sensitivity.

17. The method of claim 10, wherein the neural network includes a plurality of query clusters, and each query cluster includes historical traffic quality information for one or more search queries.

18. The method of claim 17, wherein each of the one or more search queries includes at least one of dimensional information identifying a device type where a hyperlink was selected, search query information corresponding to a search query that resulted in an advertisement displaying the hyperlink or publisher information corresponding to a third party publisher of the advertisement displaying the hyperlink.

19. A network system, comprising:
a database configured to store a plurality of internet advertisements; and
an advertiser server configured to:
receive a user search query input to a search engine running on a web page, wherein the user search query input is received from a communication device;
communicate with the database;
select an advertisement from the plurality of internet advertisements based, at least, on the user search query input, wherein the selected advertisement includes a hyperlink to an external web page;
determine whether the hyperlink is selected;
when the hyperlink is determined to be selected, access a neural network storing a plurality of historical query clusters;
parse the neural network to identify at least one query cluster relating to the hyperlink;
identify a query cluster relating to the hyperlink based on a determination that a first value identified in association with the user search query input is related to a second value identified in the query cluster, the query cluster including traffic quality information for historical search queries included in the query cluster in association with the second value;

compare the traffic quality information to a benchmark traffic quality information; and determine a pricing rate corresponding to the hyperlink based on the comparison.

20. The network system of claim 19, wherein the advertiser server is further configured to identify the query cluster relating to the hyperlink based on device type information corresponding to the communication device, and web page information corresponding to the web page.

* * * * *